United States Patent [19]

Cohen et al.

[11] Patent Number: 4,820,314
[45] Date of Patent: Apr. 11, 1989

[54] FUEL CELL POWER PLANT REFORMER

[75] Inventors: Ronald Cohen, West Hartford; Ole L. Olesen; Joseph J. Faintani, both of South Windsor; George T. Suljak, Vernon, all of Conn.

[73] Assignee: International Fuel Cells Corporation, South Windsor, Conn.

[21] Appl. No.: 13,596

[22] Filed: Feb. 11, 1987

[51] Int. Cl.[4] ............ B01J 8/06; F22B 37/24
[52] U.S. Cl. ............ 48/94; 48/196 A; 122/510; 422/110; 422/197; 422/204
[58] Field of Search ............ 48/94, 196 A, 196 R; 422/197, 204, 205, 105, 109, 110, 111, 202, 310; 122/360, 362, 365, 510, 511; 165/81, 82, 162

[56] References Cited

U.S. PATENT DOCUMENTS

| | | | |
|---|---|---|---|
| 2,648,599 | 6/1953 | Throckmorton | 422/197 |
| 2,664,346 | 12/1953 | Mayhew | 122/510 |
| 2,667,410 | 1/1954 | Pierce | 422/110 |
| 3,129,065 | 4/1964 | Koniewiez | 422/197 |
| 3,263,672 | 8/1966 | Oechslin et al. | 122/510 |
| 3,635,682 | 1/1972 | Vine et al. | 422/191 |
| 3,768,980 | 10/1973 | Anderson | 422/197 |
| 3,771,499 | 11/1973 | Marroni, Jr. et al. | 122/510 |
| 3,909,299 | 9/1975 | Corrigan | 422/190 |
| 3,951,108 | 4/1976 | Rees | 165/81 |
| 4,071,330 | 1/1978 | Sederquist | 48/94 |
| 4,098,587 | 7/1978 | Krar et al. | 48/94 |
| 4,203,950 | 5/1980 | Sederquist | 422/197 |
| 4,292,274 | 9/1981 | Faintani et al. | 422/197 |

FOREIGN PATENT DOCUMENTS

| | | | |
|---|---|---|---|
| 58-124532 | 7/1983 | Japan . | |
| 103001 | 6/1985 | Japan | 422/197 |
| 264302 | 12/1985 | Japan | 422/197 |

Primary Examiner—David L. Lacey
Assistant Examiner—Joye L. Woodard

[57] ABSTRACT

The reformer is designed for use with a large fuel cell power plant capable of producing megawatts of power, as, for example, would be used by a public utility. The catalyst tubes in the reformer have their upper ends at staggered elevations so as to be capable of having their temperatures individually monitored by infrared temperature sensors. The catalyst tubes are mounted on a floating support within the reformer housing so as to be free to undergo expansion and contraction during periods of internal temperature variation as the reformer is operated. The floating support is preferably formed from fuel manifolds suspended in the reformer housing. Baffles are included in the reformer housing for evenly distributing heat to the catalyst tube arrays. The reformer has a long burner tube which is approximately the same length as the catalyst tubes.

15 Claims, 4 Drawing Sheets

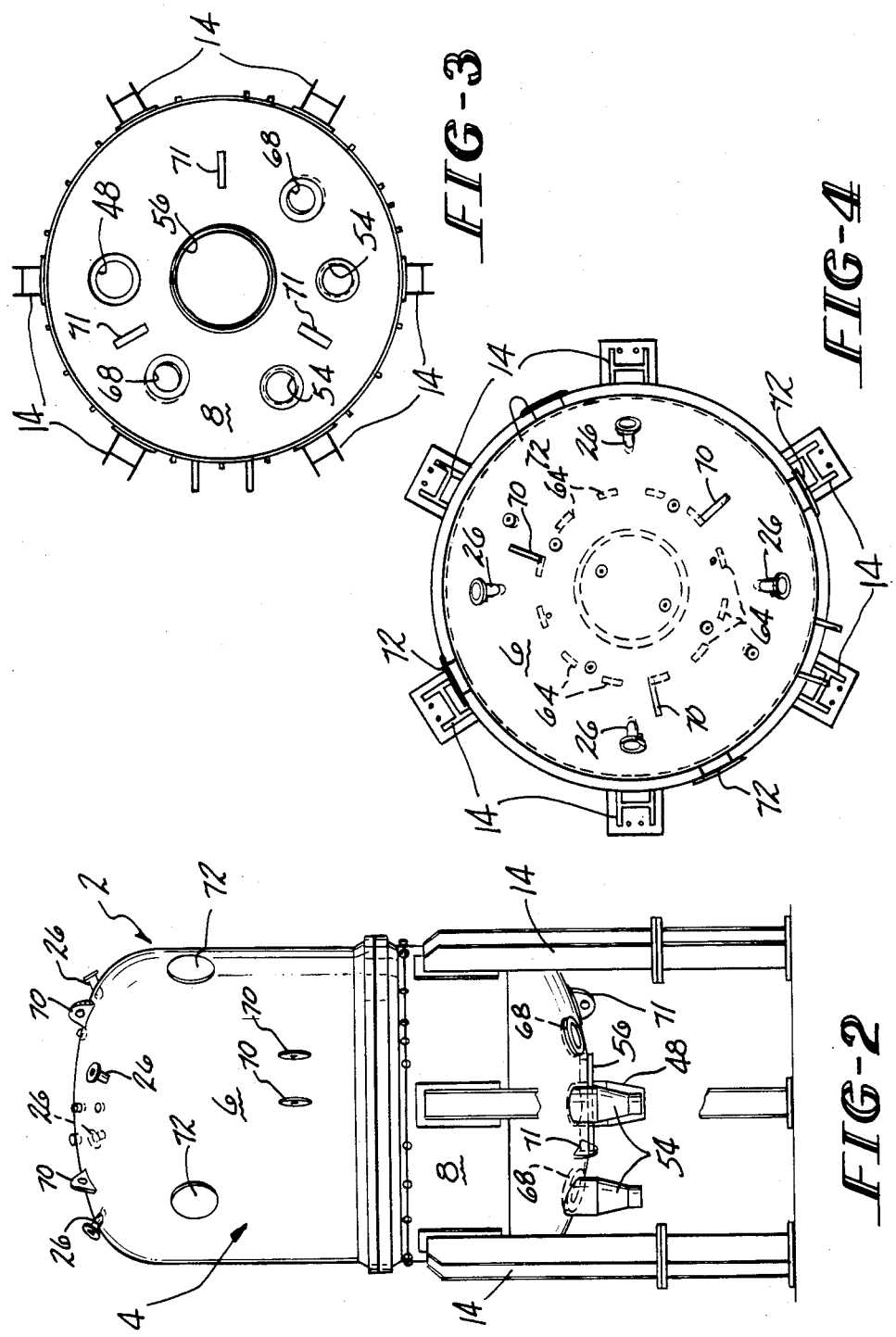

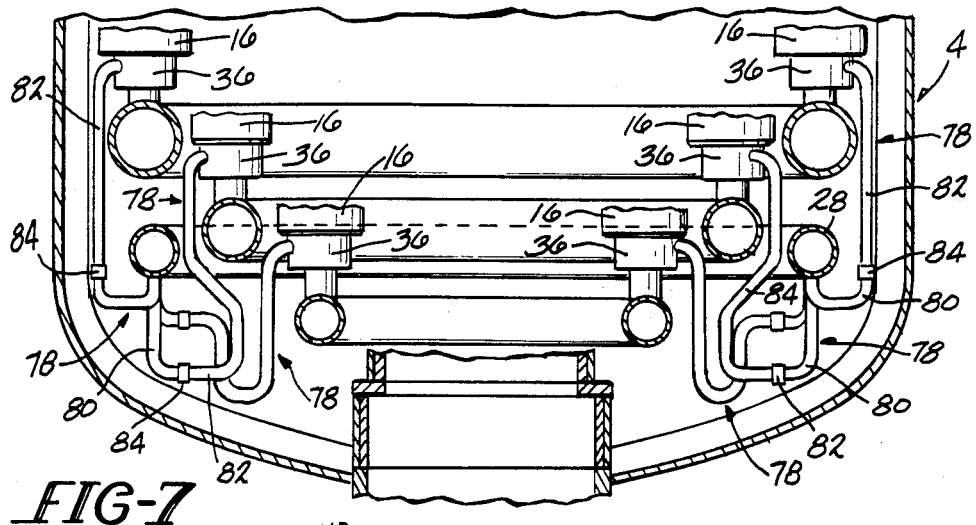
FIG-7
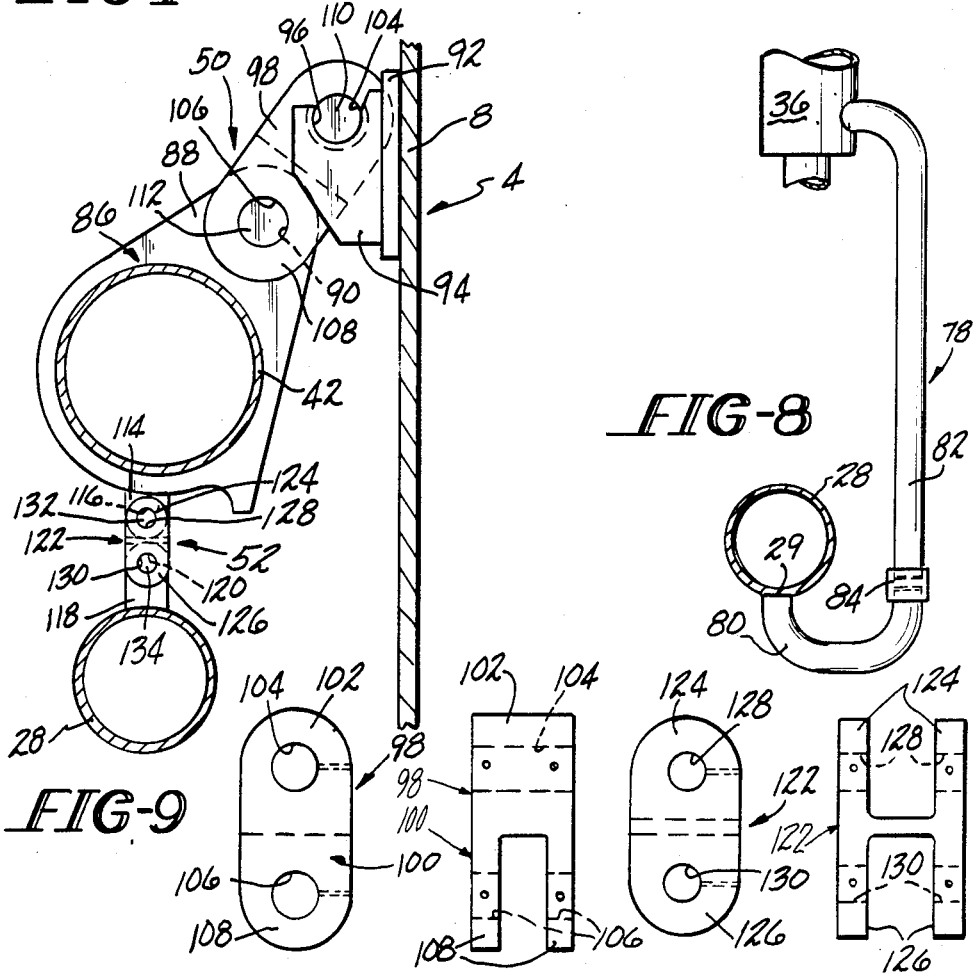
FIG-8
FIG-9   FIG-10   FIG-11   FIG-12   FIG-13

FUEL CELL POWER PLANT REFORMER

DESCRIPTION

1. Technical Field

This invention relates to fuel cell power plant reformers, and more particularly to hydrocarbon gas reformers which have more accurate temperature monitoring features with improved mounting of reactor tubes within the reformer housing.

2. Background Art

Hydrocarbon fuel reformers which are used in fuel cell power plant assemblies take a raw hydrocarbon fuel such as natural gas, propane or naphtha and catalytically convert the raw fuel to a hydrogen-rich fuel gas suitable for use as an anode fuel for the fuel cells in the plant. The raw fuel is typically percolated through catalyst beds which are contained in tubes mounted in the reformer housing. The catalytic conversion is carried out at elevated temperatures in the range of about 800° F. to about 1700° F. whereby the reformer housing will include a burner which is operated to maintain the aforesaid elevated temperatures. The maintenance of accurate controls and monitoring of the conversion temperature in the many catalyst tubes found in the reformer housing is very important to efficient and extended operation of the reformer. The interior of the housing, as noted, is heated with one or more burners and care must be taken to ensure that each of the catalyst tubes in the housing will be maintained at the proper operating temperature. If the temperature in the catalyst tubes is too low, then the conversion reaction will not proceed to the desired degree, and if the temperature in the catalyst tubes is too high, the catalyst and tube will degrade faster with time. It is known to disperse temperature sensors on the housing of the reformer to sense the temperature of various locations about the interior of the housing. The approach does not, however, necessarily accurately measure the temperature of the catalyst tubes which are dispersed about the interior of the housing. Another general approach to measuring the temperature of something which is disposed inside of a housing or the like, involves the use of infrared sensors which can be positioned outside of the housing and can monitor the infrared color spectrum changes of the thing whose temperature is being measured through one or more portals in the housing. These observed changes in the infrared spectrum can be electrically converted into temperature readings. In the case of a reformer of the character described, accurate catalyst bed temperatures could be obtained by infrared monitoring of the outside surfaces of the catalyst tubes. In the reformers of the prior art, however, this approach has not been feasible because of the large number of tubes in the large reformers, all of which are the same height in the housing so that their collective top surfaces are all contained in substantially one horizontal plane, and because the tops of these tubes are fitted with protective ceramic caps which do not allow infrared monitoring of the covered tube tops.

Another problem found in the prior art reformers of the character described relates to the expansion and contraction of the internal components of the reformer. As previously noted, there will be a large number of catalyst tubes each of which will have to be manifolded to a raw fuel inlet manifold source and also to a reformed fuel outlet manifold. These components are all metal, and will tend to expand and contract within the housing as the reformer is periodically heated and cooled. Naturally, the manifolds and catalyst tubes must be somehow connected to the housing, thus this cyclic expansion and contraction can cause problems in the internal fittings of the reformer.

The reformer of this invention has its catalyst tubes arranged in concentric circular arrays about a central burner in the reformer housing. Each circle of tubes is mounted on a respective circular manifold which receives the reformed hydrogen-rich fuel gas from the tubes, and the circular manifolds are preferably interconnected to each other and to one or more fuel exhaust passages which duct the reformed fuel from the reformer housing. The raw fuel to be reformed is distributed to the various tube arrays from a circular inlet manifold. The aforesaid manifolds are disposed in the lower portion of the reformer housing with the exhaust manifolds being suspended from the housing wall by flexible hanger brackets, and with the raw fuel inlet manifold being suspended from the exhaust manifolds by additional flexible hanger brackets. In this manner, thermal expansion and contraction of these components are accommodated due to the flexible mounts used. The burner is mounted in the center of the reformer tube arrays, and projects its flame toward the end of the housing opposite the above-noted manifolds. Hot gases from the burner are then caused to fan out and cascade down over all of the tubes so that more even heating is accomplished. The upper ends of the tubes are staggered so that, if, for example, there are three circular arrays of tubes about the axis of the housing, the tops of all the tubes in one array will be elevated above the top of all the tubes in the adjacent array, and in turn, the tops of all the tubes in that adjacent array will be elevated above the tops of all the tubes in the final array. In this manner, the tops of all the tubes in the housing can be seen from the top end of the housing. This allows the use of strategically placed infrared scanners to continuously measure the temperature of all the tubes. Thus continuous monitoring of the catalyst temperatures and heat distribution is more accurately accomplished as compared with measuring the temperature of the interior of the housing itself.

It is therefore an object of this invention to provide an improved fuel gas reformer for use in a fuel cell power plant.

It is a further object of this invention to provide a reformer of the character described having improved and more even catalyst heating capabilities.

It is another object of this invention to provide a reformer of the character described wherein the catalyst temperatures can be more accurately monitored.

It is an additional object of this invention to provide a reformer of the character described which is less susceptible to operating problems caused by thermal expansion and contraction of the reformer components contained in the reformer housing.

These and other objects and advantages of the invention will become more readily apparent to those skilled in the art from the following detailed description of a preferred embodiment of the invention when taken in conjunction with the accompanying drawings.

BRIEF DESCRIPTION OF THE DRAWINGS

FIG. 2 is an elevational view, partly broken away, of the outside of the reformer of FIG. 1;

FIG. 3 is a plan view of the bottom of the reformer;

FIG. 4 is a plan view of the top of the reformer;

FIG. 7 is a fragmented sectional view of the bottom portion of the reformer, with parts omitted, showing how the catalyst tubes are connected to the raw fuel inlet manifold;

FIG. 8 is an elevational view of one of the fuel connectors with the fuel inlet manifold being shown in section;

FIG. 9 is a fragmented elevational view partly in section showing the hanger subassemblies by which the manifolds are suspended in the reformer housing;

FIGS. 10 and 11 are elevational views of the exhaust manifold hanger; and

FIGS. 12 and 13 are elevational views of the inlet manifold hanger.

BEST MODE FOR CARRYING OUT THE INVENTION

Figure 1:
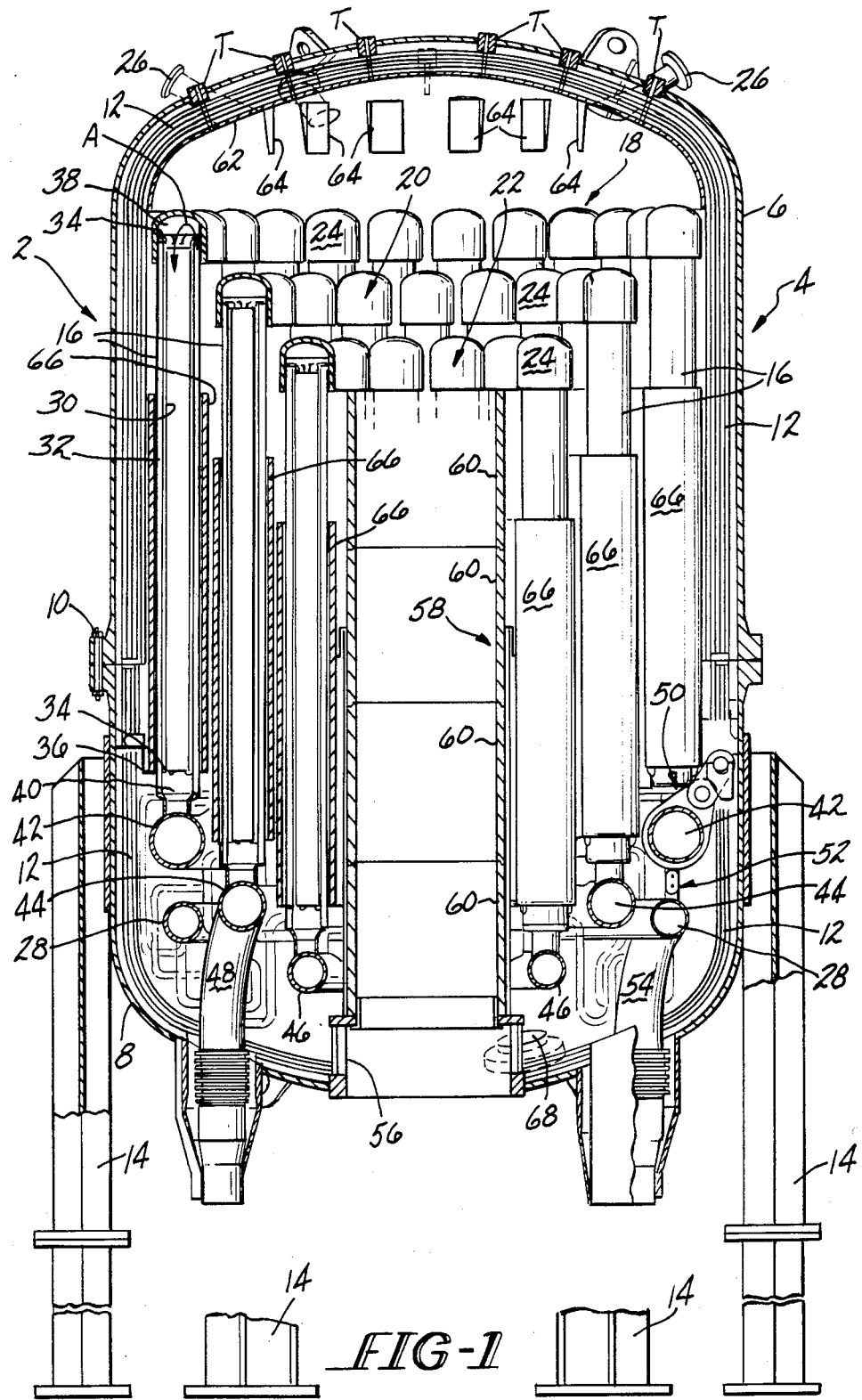
FIG. 1 is an axial sectional view of a preferred embodiment of a reformer made in accordance with this invention.

Referring now to the drawings, there is shown in FIG. 1 a preferred embodiment of a reformer denoted generally by the numeral 2. The reformer 2 has a housing 4 which comprises a top piece 6 and a bottom piece 8 connected together by a plurality of circumferentially spaced bolts 10. The interior of the housing 4 is lined with thermal insulation material 12. A plurality of legs 14 are secured to the housing 4 to elevate the latter from the ground or floor. A plurality of reformer or catalyst tubes 16 are mounted in the housing 4 in annular tiers 18, 20 and 22 concentrically disposed about the vertical axis of the housing 4. The tops of each of the reformer tubes 16 is fitted with a ceramic insulating cap 24. The highest tier 18 is sufficiently higher than the next tier 20 that a first imaginary horizontal plane passing through the uppermost point in each of the caps 24 in the tier 20 will be downwardly offset from a second imaginary horizontal plane passing through the bottom surface of each of the caps 24 in the tier 18. The same elevational differential holds true for the tiers 20 and 22. There are a plurality of sighting tubes 26 in the top of the housing 4. These tubes 26 are designed to house infrared temperature sensors, such as those made by Micron Corporation, of Wyckoff, N.J. The tubes are angled so that the sensors can be focused on the area of the tubes 16 which lies just below the bottom surface of the caps 24. The tiering of the tubes 16 is to allow the sensors to "see" the metal portion of the tubes so as to be able to accurately monitor the temperatures of the tubes 16 and thus the catalyst inside of the tubes 16.

Each of the reformer tubes 16 receives a stream of raw fuel from the fuel inlet manifold 28 in a manner set forth in more detail hereinafter. Inside each of the reformer tubes 16 is a smaller exhaust tube 30 which extends for the major portion of the length of the reformer tubes 16. Between the outside of the exhaust tube 30 and the inside of the reformer tube 16 is an annular free space 32 which the catalyst pellets are packed. Perforated screens 34 retain the catalyst pellets in place in the free space 32. An annular manifold 36 is disposed below the catalyst-filled free space 32, the manifold 36 being operable to receive raw fuel from the fuel inlet manifold 28 in a manner described in greater detail hereinafter.

The raw fuel percolates up through the catalyst bed until it reaches the uppermost area 38 of the tubes 16 which is inside of the caps 24. The fuel, which has by that time been catalytically converted to a hydrogen-rich fuel gas suitable for use in a fuel cell, reverses direction, per arrow A, and flows downwardly through the inside tube 30 to an exhaust chamber 40. Each of the reformer tubes 16 is mounted on an annular exhaust manifold, with the tubes 16 in upper tier 18 all being mounted on a first uppermost annular exhaust manifold 42, and the tubes 16 in the middle tier 20 being mounted on an intermediate annular exhaust manifold 44, while the tubes 16 in the lowermost tier 22 are mounted on a lowermost annular exhaust manifold 46. Each of the exhaust chambers 40 is in communication with respective ones of the exhaust manifolds 42, 44 or 46 and the latter are also interconnected so that processed fuel from the reformer tubes 16 passes into the exhaust manifolds 42, 44 and 46. Processed fuel is then exhausted from the manifolds 42, 44 and 46 and the reformer 2 by an exhaust pipe 48 which is connected to the intermediate exhaust manifold 44. The uppermost exhaust manifold 42 is connected to the interior of the housing 4 by a plurality of hanger assemblies denoted generally by the numeral 50, which will be explained in greater detail hereinafter. The raw fuel inlet manifold 28 is connected to the exhaust manifold 42 by a plurality of hanger assemblies denoted generally by the numeral 52, which will also be explained in greater detail hereinafter. Raw fuel is delivered to the inlet manifold 28 by a pair of inlet pipes 54 (only one of which is shown).

The burner 56 is disposed on the axis of the housing 4 and is an up-fired burner. The burner 56 is thus in the center of each of the tube tiers 18, 20 and 22. A frame and hot gas vectoring tube 58 is mounted on the burner 56 and extends upwardly toward the top of the housing 4. The hot gas tube 58 is preferably made up of subsections 60 so that its length may be varied if desired. In the embodiment shown, the tube 58 is almost the same height as the top of the inner tier 22 of the reformer tubes 16. A relatively long burner tube is desirable so that the hot gases remain radially confined until they are relatively close to the top of the housing 4.

The burner tube 58 will be long enough to ensure complete combustion and mixing of the burner fuel within the tube 58, and also to ensure that little or no heat is transferred laterally from within the tube 58 to the lower tier 22 of catalyst tubes 16 which is disposed closely adjacent to the burner tube 58. Thus, the burner tube 58 will be at least as long as a majority of the length of the catalyst tubes 16, and preferably will be approximately the same length as the catalyst tubes 16. Mounted on the inside of the top of the housing 4 is an impingement board 62 which extends down to approximately the level of the top of the highest tier 18 of the reformer tubes 16. A plurality of gas turbulence vanes or baffles 64 are mounted in a circular set on the inner surface of the impingement board 62. Both the impingement board 62 and the vanes 64 are made from a heat resistant ceramic material. The hot gases issuing from the mouth of the tube 58 impinge upon the dome-shaped board 62 where they are deflected radially outwardly through a full 360° arc and into the vanes 64. The vanes 64 impart turbulence to the gases so that gases moving between the vanes will swirl down onto the radially outer tubes 16 in the array, and gases impinging upon the vanes 64 will swirl in a tighter cascade down onto the radially inner tubes 16 in the array. In this manner the hot gases from the burner tube 58 are evenly distributed over the reformer tubes. A plurality of thermocouples T are mounted on the top of the housing 4 to measure the temperature of the burner gases issuing from the tube 58. The hot gases flow downwardly in the housing 4 and between the tubes 16. Each of the tubes 16 has a ceramic heat retention sleeve 66 mounted about its lowermost portion. The sleeves 66 are formed with internal helical rifling-grooves which form passages for conducting the hot gases down along the outside of the tubes 16. This increases the heating capabilities of the hot gases and also contributes to evenness of the heating of the tubes 16. The hot gases upon reaching the bottom of the housing 4 are exhausted therefrom through exhaust ports 68 from whence they are ducted to other parts of the power plant.

Referring now to FIGS. 2 through 4, some external features of the reformer 2 are shown. It will be noted that there are four of the sight tubes 26 mounted on the top half 6 of the housing 4, and that they are evenly spaced at 90° intervals about the axis of the housing 4. There are a plurality of lift lugs 70 disposed about the top half 6 to facilitate disassembly of the housing 4 for maintenance. There are also three heavy-duty sling lugs 72 mounted on the top half 6 of the housing 4 so that the entire assembled housing can be moved with a crane or the like. From FIG. 4, the dispersement of the turbulence vanes 64 on the inside of the housing 4 is apparent. FIGS. 2 and 3 show the dispersement of the various exhaust and inlet ports 48, 54, 56 and 68 in the bottom half 8 of the housing 4. Lifting lugs 71 are also provided on the bottom half 8 of the housing 4.

Figure 5:
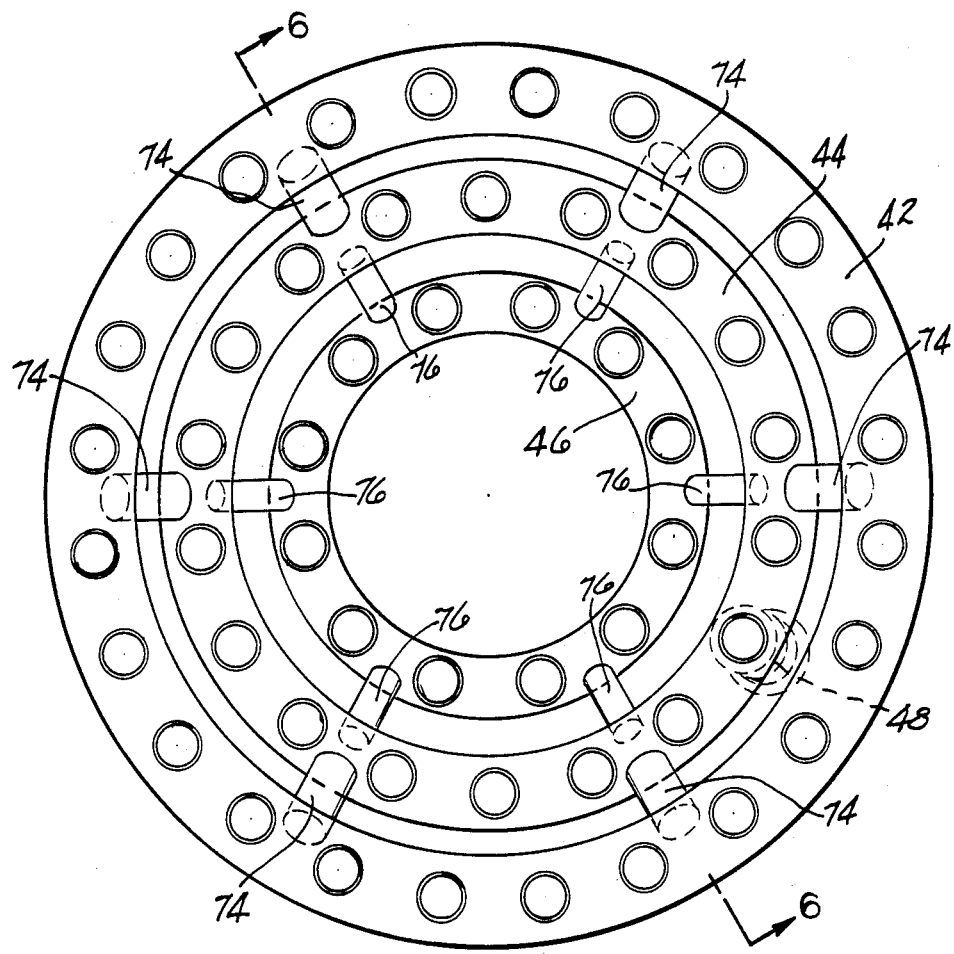
FIG. 5 is a plan view of the exhaust manifold subassembly of the reformer of FIG. 1.
Figure 6:
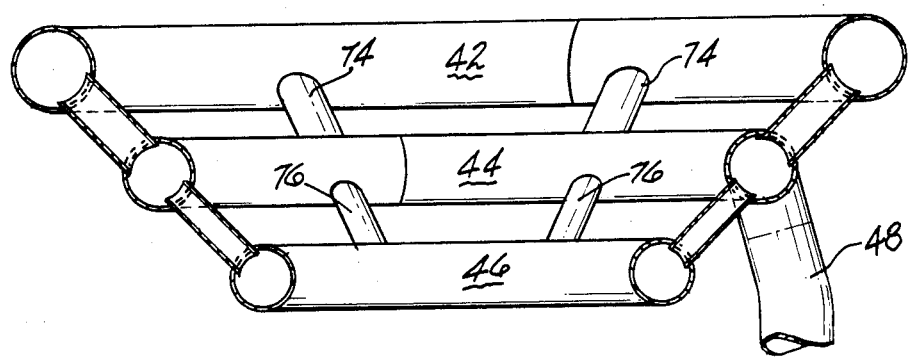
FIG. 6 is a sectional view of the manifold subassembly taken along line 6—6 of FIG. 5.

Referring now to FIGS. 5 and 6, the manner in which the processed gas exhaust manifold subassembly is formed is more clearly shown. The outer manifold 42 is connected to the intermediate manifold 44 by six evenly spaced pipes 24 which are hollow ducts welded to the manifolds 42 and 44 so as to provide a strong stable connection and to provide passages whereby the processed gases can migrate from the manifold 42 to the manifold 44. Likewise, the inner manifold 46 is connected to the intermediate manifold 44 by similar spoke pipes 76 which provide passages whereby processed gas can migrate from the inner manifold 46 to the intermediate manifold 44. The exhaust pipe 48 is shown. The circular openings on the manifolds 42, 44 and 46 indicate the positions of the reformer tubes. It will be noted that the manifolds 42, 44 and 46 are formed from arcuate sections which are welded together as indicated in FIG. 6.

Referring now to FIGS. 7 and 8, details of the raw fuel feed system whereby raw fuel is fed from the raw fuel inlet manifold 28 to the various raw fuel inlet manifolds 36 on the reformer tubes 16 are shown. Along the lower surface of the manifold 28 there are a plurality of ports 29 one for each reformer tube 16 in the housing 4. Each of these ports 29 will have associated with it a connector pipe assembly denoted generally by the numeral 78. Each connector pipe assembly 78 consists of two component pipes 80 and 82, plus a connecting sleeve 84. The pipes 80 and 82 are connected to the manifold 28, the pipes 82 are connected to the manifolds 36 and the sleeves 84 interconnect the pipes 80 and 82. Thus separate raw fuel flow paths are provided between the manifold 28 and the reformer tube manifolds 36.

Referring now to FIGS. 9 through 13, details of the manifold hanger assemblies 50 and 52 are shown. The exhaust hanger assembly 50 includes a hanger member 86 fitted onto the manifold 42 and including an arm portion 88 having a passage 90 therethrough. A U-shaped plate 92 is welded to the inside surface of the lower half 8 of the housing 4 and a pair of plates 94 are welded to the opposite legs of the plate 92 projecting into the housing 4. The plates 94 have upwardly open recessed shelves 96 therein. A pivotable link 98, shown in detail in FIGS. 10 and 11 serves to connect the hanger 86 and the plates 94. The link 98 has one bifurcated end portion 100 and an opposite nonbifurcated end portion 102. A through bore 104 extends through the end portion 102, and aligned bores 106 extend through each ear 108 of the bifurcated portion 100. The end portion 102 is disposed between the plates 94 with a elongated pin 110 extending through the bore 104 and onto the recessed shelves 96. The hanger arm 88 is disposed between the link ears 108 and a pin 112 extends through the aligned bores 90 and 106.

The hanger assembly 52 includes a plate 114 welded to the hanger 86 and having a through hole 116 therein. A second plate 118 is welded to the manifold 28 and includes a through hole 120 therein. A link 122, the details of which are shown in FIGS. 12 and 13 interconnects the plates 114 and 118. Both ends of the link 122 are bifurcated to form opposed pairs of ears 124 and 126. The ears 124 have aligned holes 128, and the ears 126 also have aligned holes 130. The plate 114 is disposed between the ears 124 and a pin 132 extends through aligned holes 116 and 128. The plate 118 is disposed between the ears 126 and a pin 134 extends through aligned holes 120 and 130. It will be appreciated that there are a plurality of the hanger assemblies 50 and 52 dispersed about the circumference of the housing 4. By providing pins and hangers to suspend the manifolds in the housing thermal, expansion and contraction of the manifolds during operation of the reformer can be accommodated by pivoting of the links and hangers about the pins.

It will be readily appreciated that the reformer construction of this invention will provide for improved catalyst bed heating and thereby will display longer operational life between overhaul shutdowns. Direct temperature monitoring of the catalyst tubes ensures proper operating conditions. The conical configuraton of the tube mounting manifold assembly gives the structure great strength and allows the tiering of the tops of the tubes without requiring that different length tubes be used. This contributes to manufacturing efficiencies and cost savings. The flexible connectors which attach the manifolds to the reformer housing give the required strength but also allow the manifolds to expand and contract from temperature variations in the housing without damaging the manifolds on the housing. Although the disclosed embodiment of this invention shows the reformer components being mounted in the bottom of the housing and extending upwardly, the components could be inverted if desired and still be operable.

Since many changes and variations of the disclosed embodiment of the invention may be made without departing from the inventive concept, it is not intended to limit the invention otherwise than as required by the appended claims.

We claim:

1. For use in a fuel cell power plant, a catalytic reformer assembly for converting raw hydrocarbon fuel to a hydrogen-rich gaseous fuel, said reformer assembly comprising:

(a) a housing having a cylindrical side wall, a first dome-shaped end wall, and a second end wall opposite said first wall;

(b) a burner in said housing positioned coaxially with said housing side wall, said burner opening through said housing second wall and including a hot gas tube which extends toward said first wall of said housing;

(c) a plurality of catalyst tubes disposed in said housing, each of said catalyst tubes having a first closed end and an opposite second end, and each of said catalyst tubes being provided with a ceramic heat-insulating cover having an annular free edge and overlying said closed end of each catalyst tube, said covers extending a short distance toward said second ends of said catalyst tubes, said catalyst tubes being arranged in a plurality of circular arrays each of which is concentric with said burner, said arrays being disposed in tiers so that the first ends of all of the catalyst tubes in a first tier extend beyond the first ends of all the catalyst tubes in a second tier to the extent that a first imaginary plane containing the endmost point in each ceramic cover in said second tier is closer to said housing second wall than a secondary imaginary plane containing the annular free edges of each ceramic cover in said first tier; and (d) at least one optical temperature sensor means mounted on said housing and focused on the portions of said catalyst tubes in said first tier which lie between said imaginary planes to monitor the temperature of catalyst tubes in said first tier.

2. The reformer assembly of claim 1 wherein there are three tiers of said catalyst tubes and four said sensor means, each of which is positioned so as to monitor the temperatures of said catalyst tubes in a quandrant of said tiers.

3. The reformer assembly of claim 2 wherein said first wall of said housing is a top wall, and said second wall of said housing is a bottom wall, and wherein the tier of catalyst tubes closest to said housing side wall is the highest tier and the tier of said catalyst tubes closest to said burner hot gas tube is the lowest tier.

4. The reformer assembly of claim 3 wherein said burner hot gas tube has an upper end surface disposed substantially even with said annular face edges of said catalyst tube covers in said lowest tier of the catalyst tubes.

5. The reformer assembly of claim 3 further comprising means on said housing top wall for deflecting hot gases issuing from said burner hot gas tube toward said housing side wall.

6. The reformer assembly of claim 3 further comprising a plurality of annular gas fuel manifolds disposed in said housing proximate said housing bottom wall with the second ends of the catalyst tubes in said first tier thereof being mounted on a first one of said gas fuel manifolds and with the second ends of the catalyst tubes in said second tier thereof being mounted on a second one of said gas fuel manifolds, and wherein said second one of said gas fuel manifolds is closer to said housing bottom wall than said first one of said gas fuel manifolds is, and all of said catalyst tubes in said first and second tiers thereof are substantially equal in length.

7. The reformer assembly of claim 6 further comprising a plurality of spoke tubes secured to said first and second gas fuel manifolds to stabilize the latter and to provide for flow of hydrogen-rich gaseous fuel between said first and second gas fuel manifolds.

8. The reformer assembly of claim 7 further comprising flexible means connected to said housing side wall and also connected to a radially outermost one of said gas fuel manifolds to provide flexible suspension means for suspending said fuel manifolds in said housing above said bottom wall of said housing, said flexible suspension means being constructed so as to automatically adjust to expansion and contraction of said gas fuel manifolds induced by temperature changes during operation of the reformer assembly.

9. The reformer assembly of claim 8 further comprising an annular raw fuel inlet manifold disposed in said housing and operably connected to said catalyst tubes to deliver raw hydrocarbon fuel to the latter, said inlet manifold being suspended from said gas fuel manifolds by flexible means.

10. For use in a fuel cell power plant, a catalytic reformer assembly for converting raw hydrocarbon fuel to a hydrogen-rich gaseous fuel, said reformer assembly comprising:

(a) a housing having a cylindrical side wall, a dome-shaped top wall, and a bottom wall;

(b) a burner in said housing positioned coaxially with said housing side wall, said burner opening through said housing bottom wall and being arranged to direct hot gases toward said top wall;

(c) a plurality of catalyst tubes disposed in said housing, said catalyst tubes being arranged in a plurality of circular tiers, each of which is concentric with said burner;

(d) a plurality of annular gaseous fuel manifolds in said housing proximate said housing bottom wall, each of said catalyst tube tiers being mounted on a respective one of said gaseous fuel manifolds, with the individual catalyst tubes being connected at their bottom ends to the gaseous fuel manifolds so that the hydrogen-rich gaseous fuel produced in said catalyst tubes is exhausted into said gaseous fuel manifolds from said catalyst tubes, said gaseous fuel manifolds being vertically offset one from another to provide the tiers in which said catalyst tubes are disposed;

(e) a plurality of radial spoke tubes interconnecting said gaseous fuel manifolds with each other to stabilize the positioning of said gaseous fuel manifolds with respect to each other, and to provide for flow of the gaseous fuel between the gaseous fuel manifolds; and (f) hanger means for flexibly suspending said gaseous fuel manifolds from said housing side wall and above said housing bottom wall, said hanger means being constructed so as to automatically adjust to thermally induced expansion and contraction of said gaseous fuel manifolds during operation of the reformer assembly.

11. The reformer assembly of claim 10 further comprising an annular raw fuel inlet manifold disposed in said housing and concentric with said gaseous fuel manifolds, said inlet manifold being operably connected to each one of said catalyst tubes to deliver raw hydrocarbon fuel to the latter, and said inlet manifold being flexibly suspended from one of said gaseous fuel manifolds whereby said inlet manifold may freely expand and contract under varying thermal conditions.

12. The reformer assembly of claim 10 wherein said hanger means comprises interconnected links and pins which provide pivoting flexibility to said hanger means.

13. The reformer assembly of claim 11 wherein said inlet manifold is suspended from said one of said gaseous fuel manifolds by interconnected pin and link hangers which provide pivoting flexibility between said inlet manifold and said gaseous fuel manifolds.

14. The reformer assembly of claim 13 wherein said gaseous fuel manifolds and said spoke manifolds are positioned to form an inverted generally conical support structure for said catalyst tubes.

15. The reformer assembly of claim 14 wherein three are three of said gaseous fuel manifolds concentrically disposed about said burner, with the gaseous fuel manifold which is closest to said burner also being closest to said housing bottom wall, and with the gaseous fuel manifold which is furthest from said burner also being furthest from said housing bottom wall.

* * * * *